July 24, 1956

J. JOHNSON 2,755,612

STONE GATHERING MACHINE HAVING A HORIZONTALLY
ROTATABLE SIFTING DRUM

Filed Aug. 14, 1953

INVENTOR.
John Johnson
BY
McMorrow, Berman & Davidson
ATTORNEYS

July 24, 1956
J. JOHNSON
2,755,612
STONE GATHERING MACHINE HAVING A HORIZONTALLY
ROTATABLE SIFTING DRUM
Filed Aug. 14, 1953
4 Sheets-Sheet 2
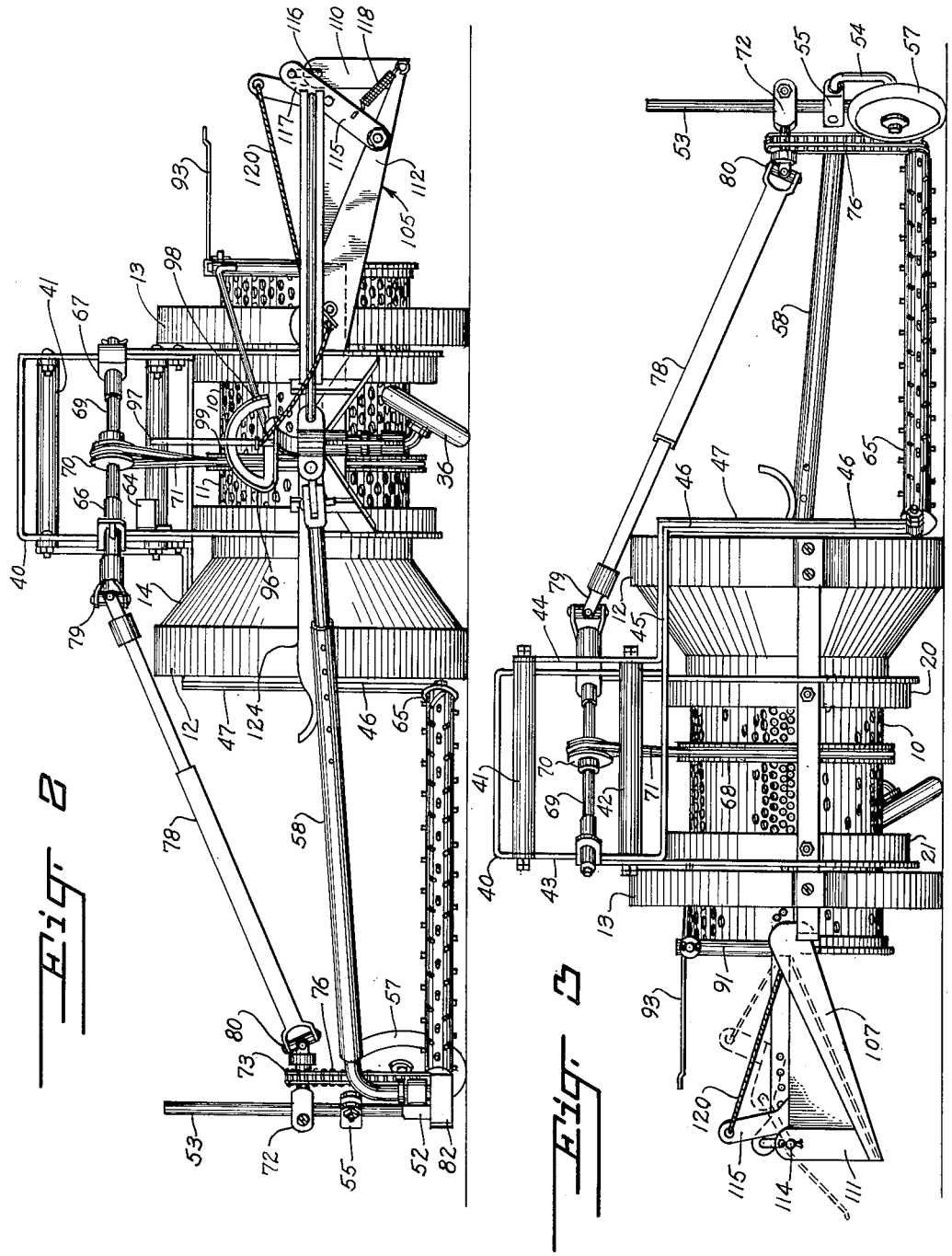
INVENTOR.
John Johnson
BY
McMorrow, Berman + Davidson
ATTORNEYS

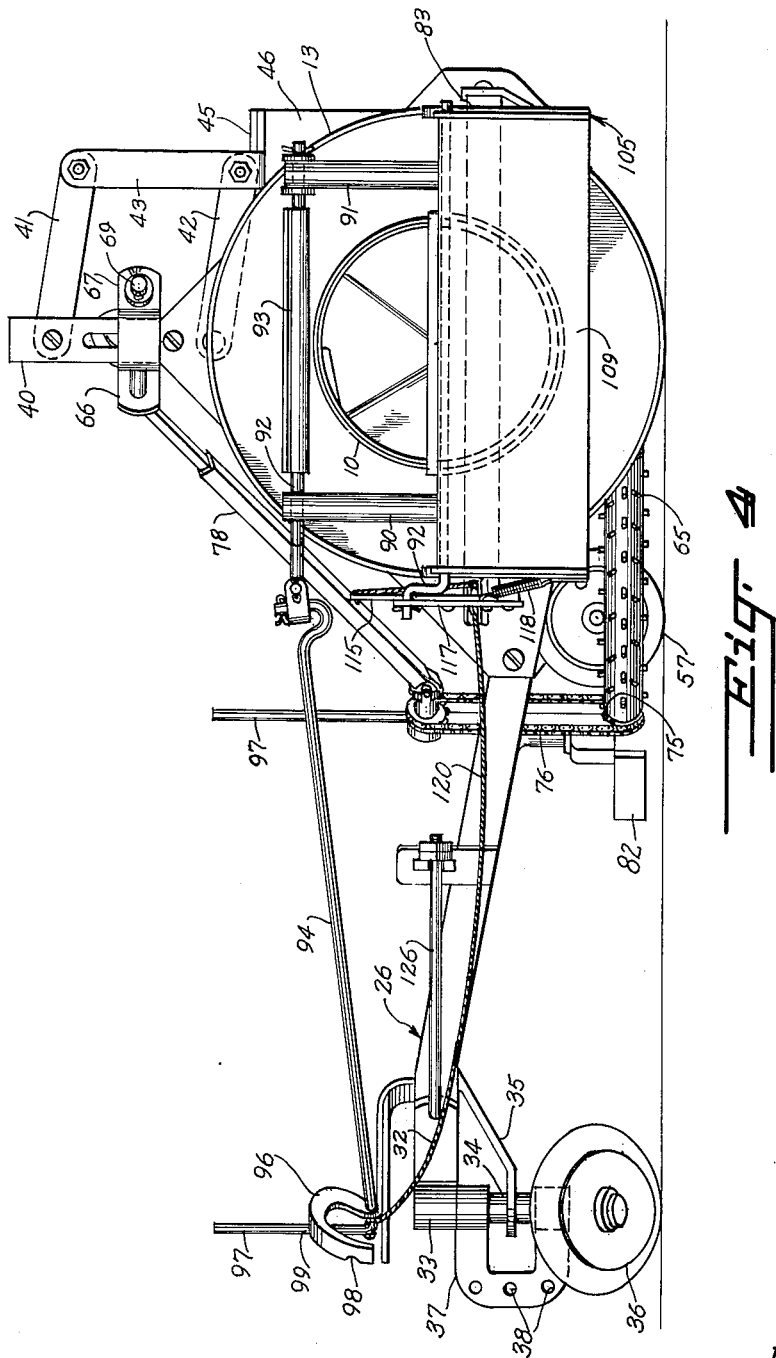

INVENTOR.
John Johnson
BY
McMorrow, Berman + Davidson
ATTORNEYS

United States Patent Office 2,755,612
Patented July 24, 1956

2,755,612

STONE GATHERING MACHINE HAVING A HORIZONTALLY ROTATABLE SIFTING DRUM

John Johnson, Brockton, Mont.

Application August 14, 1953, Serial No. 374,247

4 Claims. (Cl. 55—17)

This invention relates to mobile stone gathering machines and more particularly to a stone gathering machine which is effective to remove lumps of hard clay or other crushable material from the stones gathered by the machine.

It is among the objects of the invention to provide an improved stone gathering machine which gathers stones from the ground and, after passing the stones and other gathered material through a rotatable separating drum, discharges the stones into a receptacle movable with the machine and from which the stones can be discharged at selected intervals; which has a vertically adjustable stone dislodging and gathering element; which has manually controlled means for determining the length of the intervals that the gathered stones are retained in the separating drum; which can be conveniently towed by an ordinary farm tractor; and which can be placed in an inoperative and reduced width condition for movement from place to place.

Other objects and advantages will become apparent from a consideration of the following description and the appended claims in conjunction with the accompanying drawings wherein:

Figure 2 is a front elevational view of the machine illustrated in Figure 1;

Figure 3 is a rear elevational view of the stone gathering machine;

Figure 4 is a side elevational view of the machine looking at the right-hand side of the machine as illustrated in Figure 1;

Figure 1:
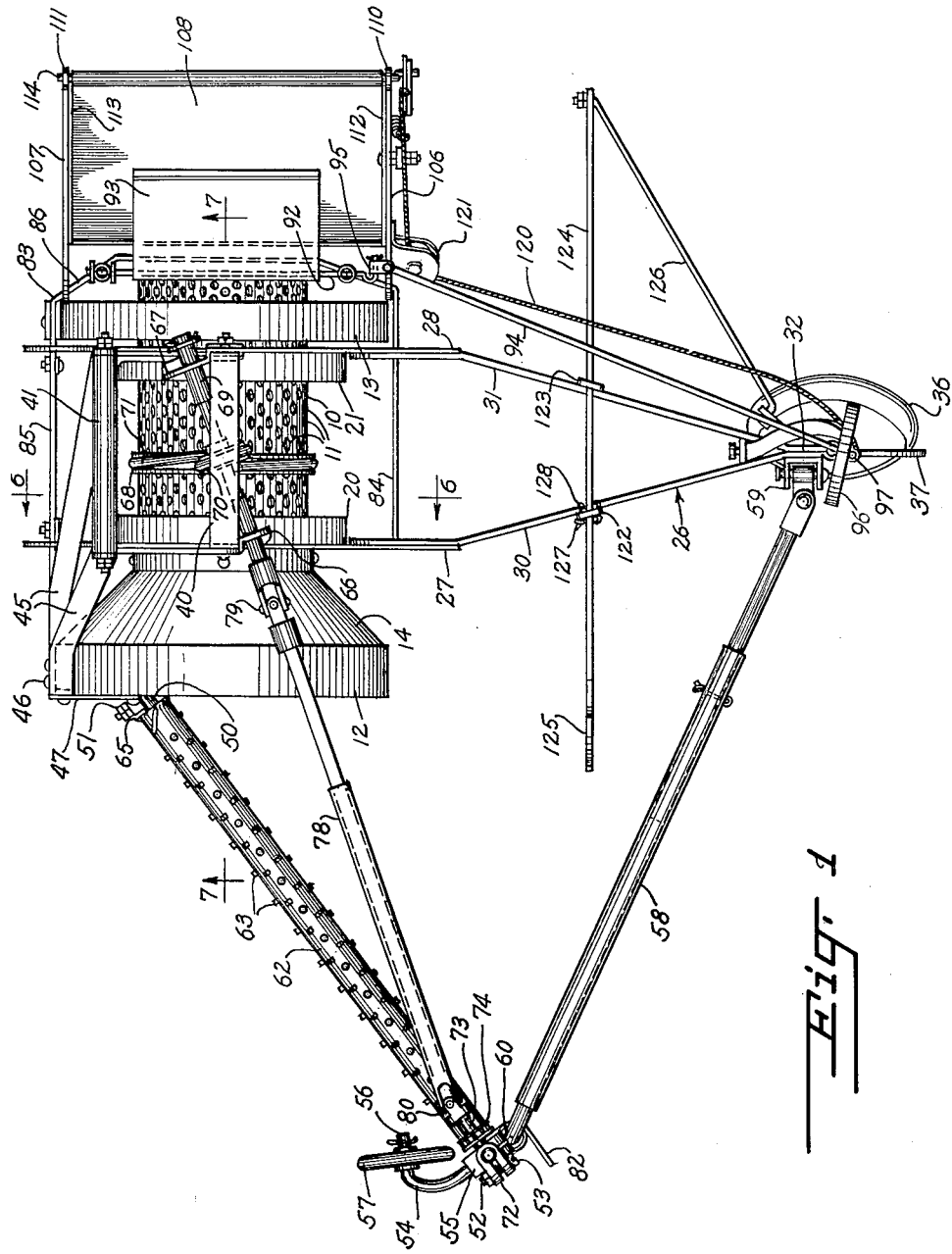
Figure 1 is a top plan view of a stone gathering machine illustrative of the invention.
Figures 5, 6:
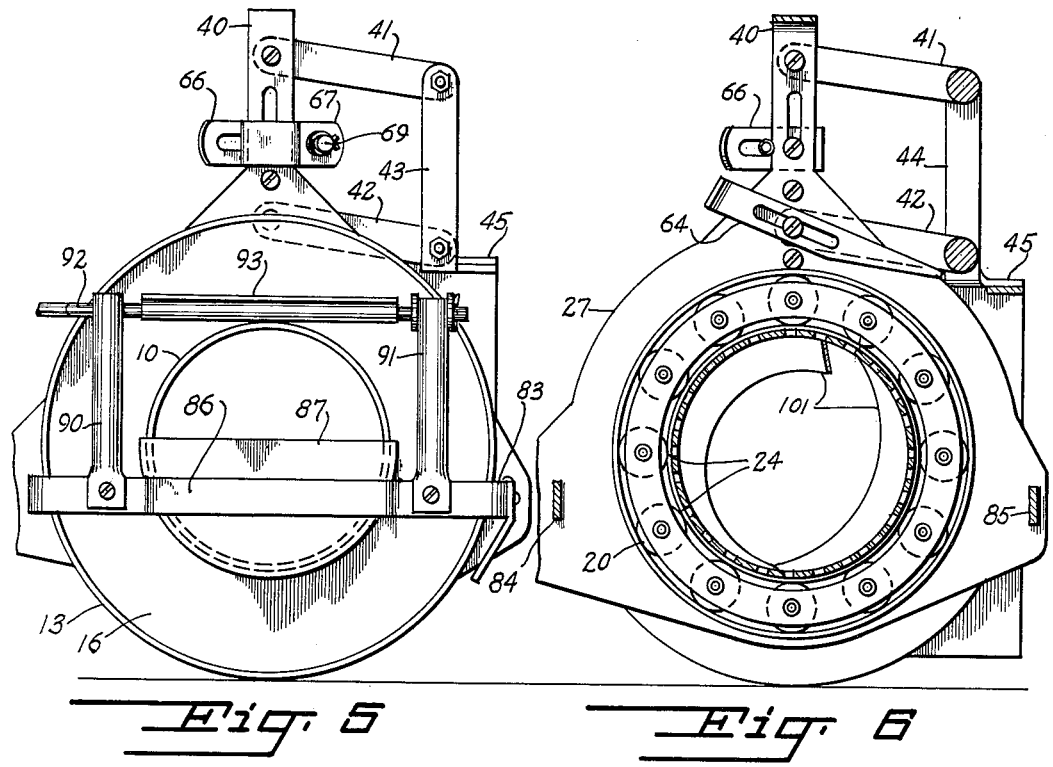
Figure 5 is a fragmentary end elevational view of the machine with the stone receiving receptacle at the right-hand end of the machine, as illustrated in Figure 1 removed.
Figure 6 is a transverse cross sectional view on the line 6—6 of Figure 1.

With continued reference to the drawings, the stone gathering machine comprises an open ended drum 10 of a length and diameter sufficient for the drum to carry a large quantity, such as a wagonload of gathered stones, and having its wall provided with closely spaced perforations 11 of a diameter such that stones of a size to interfere with agricultural use of the land will not pass therethrough while crushable material, such as hard lumps of clay, when crushed or pulverized by the tumbling of the material and the stones in the drum will pass through the perforations and be returned to the land.

Flat open ended tires 12 and 13 of circular shape and larger diameter than the drum 10 are mounted on the drum coaxially thereof and are adapted to roll along the ground and support the drum above the ground. The first tire 12 is disposed outwardly of one end of the cylindrical portion of the drum 10, and is connected to the adjacent end of the drum by a tapered drum portion 14 of truncated conical shape, the smaller end of which is provided with a cylindrical terminal flange 15 surrounding and secured to the adjacent end of the perforated drum 10 and the larger end of which is joined to the tire 12 at the end of this tire adjacent the drum. The other or second tire 13 is mounted on the drum by a radially disposed web 16 disposed within the tire and having a central aperture therein receiving the drum 10 near the end of the drum remote from the tire 12. The tire 13 may be secured in position on the drum by suitable means, such as the bands 17 and 18, surrounding the drum at respectively opposite sides of the web 16 and bearing against the surfaces of the web immediately surrounding the drum receiving aperture therein.

Bearing structures 20 and 21 surround the drum at locations spaced apart longitudinally of the drum between the tire 13 and the truncated conical end portion 14 of the drum, and these bearing structures comprise annular races 22 and 23 of channel shaped cross section having their open sides immediately surrounding the drum, and rollers, as indicated at 24 and 25 for the races 22 and 23 respectively, journaled in the races and bearing on the outer surface of the drum to provide substantially frictionless rotation of the drum within the bearing structures.

A tongue structure, generally indicated at 26, is positioned forwardly of and extends transversely with respect to the drum 10 and has its rearward end secured to said drum or the bearing structures 20 and 21. This tongue structure comprises spaced apart plates 27 and 28 apertured to receive the drum 10, the plate 27 being secured to the outer surface of the bearing structure 20, and the plate 28 being secured to the outer surface of the bearing structure 21, and legs 30 and 31 extending forwardly from the front ends of the spaced apart plates 27 and 28 and converging to a common bar structure 32 at their front ends. The forward end of the tongue structure 26 is supported by a steerable wheel assembly. Specifically, at the front end of the bar structure 32 the tongue is provided with a vertically disposed sleeve or eye formation 33 of cylindrical shape and a front wheel stem 34 has its upper end journaled in the sleeve formation 33 and extends downwardly from the front end of the tongue. A brace 35 extends downwardly and forwardly from the tongue and has in its front end portion an aperture rotatably receiving the stem 34 and a front supporting wheel 36 is journaled on the lower end of the stem 34. The rotational axis of the wheel is upwardly inclined relative to the axis of the stem 34 to enable the wheel to resist a tendency of the machine to turn to the right, as will later appear.

A hitch element or bar 37 of U shape is provided at its ends with sleeve formations receiving and secured to the stem 34 between the tongue sleeve formation 33 and the journal of the wheel 36, the wheel and stem being turnable with this hitch bar to steer the machine, and the hitch bar is provided in its front end with vertically spaced apart apertures 38 to provide an adjustable connection between the front end of the stone gathering machine and the drawbar of a towing tractor. It is to be noted that the tires 12 and 13 and the drum 10 attached thereto are rotatable in a clockwise direction responsive to the towing movement of the tongue structure 26.

A U-shaped frame member or arch 40 is secured at its ends to the plates 27 and 28 at the top sides of these plates and extends vertically upwardly from the plates 27 and 28 and the bearing structures 20 and 21 with its straight intermediate portion extending across the space between the bearing structures substantially parallel to the rotational axis of the drum 10. U-shaped brackets 41 and 42 are pivotally connected at their open ends to the frame member 40, one near the upper end and one near the lower end of the frame member or arch, and these brackets extend rearwardly from the arch 40 in spaced apart and substantially parallel relationship to each other. Links 43 and 44 pivotally interconnect the brackets 41 and 42 at the ends of these brackets remote from the arch 40 and at the respectively opposite ends of the brackets, and these links are both extended at their lower ends, as indicated at 45 and 46, to extend outwardly somewhat beyond the outer end of the tire 12 and then downwardly across the outer end of the tire rearwardly of the center thereof. A guard plate 47 is secured along one edge of the portion 46 of the link extending across the outer end of the tire 12, and this guard plate extends forwardly partially across the open outer end of the tire 12.

A horizontally disposed rotatable stone gathering implement 62 is positioned on the side adjacent the first tire 12 and at an angle with respect thereto with one end contiguous to the other end of the tire 12 or the end remote from the end affixed to the drum 10, the other end of the implement being forwardly of and spaced from the tire 12. The one implement end is supported by the drum 10 or connected to the drum for swinging movement horizontally and for up and down movement with the other implement end supported by a wheel 57. Specifically, the implement 62 is an elongated cylinder which extends longitudinally of a shaft 50 for substantially its entire length and is journaled on said shaft for rotation therearound. The shaft 50 is connected at one end to the lower end of the link extension 46 by a universal joint connection 51 and a bracket 52 is mounted on the end of the shaft 50 remote from the tire 12. A post 53 extends vertically upwardly from the bracket 52 and a wheel stem 54 is adjustably connected to the post 53 intermediate the length of the post by a clamp bracket 55 secured on one end of the wheel stem. The wheel stem is longitudinally curved and is provided at its end remote from the clamp 55 with a wheel axle portion 56, the axis of which is substantially horizontally disposed ahead of the rotational axis of the drum when the machine is in operative condition, as illustrated in Figure 1. The wheel 57 is carried by the wheel axle portion 56.

An adjustable length brace 58 is connected at one end to the bar portion 32 at the front end of the tongue structure 26 by a universal joint connection 59 and is pivotally connected at its outer end to the bracket 52 on the outer end of the shaft 50 for movements relative to the bracket 52 about a substantially vertical axis. This brace 58 holds the shaft 50 in a position in which the shaft is outwardly and forwardly inclined from its pivotal connection 51 with the lower end of the extension 46 of the links 43 and 44. The brace 58 and the bracket 52 on the shaft 50 of the implement 62 constitute cooperating means carried by the forward end of the tongue structure and the implement 62 adjacent its other end for releasably holding the implement in any selected position of its horizontal swinging movement.

The cylinder 62 has a length corresponding to the desired swath and has a diameter materially less than the diameter of the drum 10. Spikes 63 are secured on the cylinder 62 and projects radially outwardly from the cylinder at locations spaced apart along and around the cylinder, such that the spikes will dislodge stones from the ground and, as the cylinder rotates, moves the stones inwardly along the cylinder to the open outer end of the tire 12 from which they are moved into the drum 10. The spikes 63 are preferably arranged in rows extending longitudinally of the cylinder and angularly spaced apart around the cylinders with the spikes in one row staggered relative to the spikes in the adjacent rows, and the spikes have a length and shape such that, while they will effectively dislodge stones in the upper portion of the ground, they will not cause debris, such as grass and stubble, to wrap around the cylinder and destroy the stone dislodging effect of the spikes, but will separate the trash or debris from the stones and leave the trash or debris on the ground.

The shaft 50 and cylinder 62 together constitute a stone dislodging boom pivotally mounted at one end adjacent the end of the drum carrying the tire 12, and extending horizontally at an inclination directed outwardly and forwardly from the pivotal connection between the boom and the boom supporting structure mounted on the cylinder, the adjustable brace 58 holding the boom in this outwardly and forwardly inclined position and being effective, upon adjustment of the length thereof, to vary the forward inclination of the boom relative to the rotational axis of the drum.

A cam bar 64 is slidably mounted on the leg of the arched frame member 40 nearest the tire 12 and slidably engages under the lower bracket 42 of the boom attaching assembly. By moving this cam bar 64 longitudinally, the brackets 41 and 42 remote from the frame member 40, will be raised or lowered and will, in turn, raise or lower the link extensions 45 and 46, thereby providing a vertical adjustment for the end of the boom 65, including the shaft 50 and cylinder 62, and the outer end of this boom is vertically adjusted by moving the clamp bracket 55 to selected positions of adjustment along the post 53 and clamping the bracket in such selected positions of adjustment.

Bearing extensions 66 and 67 are mounted on the legs of the frame member 40 with the bearing extension 66 nearest the tire 12 projecting forwardly from the associated frame member leg, and the bearing extension 67 nearest the tire 13 projecting rearwardly from the corresponding frame member leg. A belt pulley 68 extends around and is secured to the drum 10 between the bearing structures 20 and 21 and a shaft 69 is journaled in the bearing extensions 66 and 67 and provided intermediate its length with a belt pulley 70. A belt 71 extends around the belt pulleys 68 and 70, being crossed over between these pulleys, so that the shaft 69 is driven in a direction opposite the rotational direction of the drum 10. The thus described structure constitutes means connecting the implement 62 to the drum 10 for rotation in counterclockwise direction responsive to the rotation of the tires 12 and 13 and drum 10 carried thereby in the clockwise direction.

A bearing bracket 72 is adjustably clamped onto the post 53 above the clamp bracket 52 for the wheel stem 54, and a stub shaft 73 is journaled at one end in the bracket 72 and carries intermediate its length a chain sprocket 74. A chain sprocket 75, complementary to the sprocket 74, is mounted on the outer end of the cylinder 62 and a link chain 76 drivingly connects the sprocket 74 to the sprocket 75. An adjustable length drive shaft 78 is connected at one end to the adjacent end of the shaft 67 by a universal joint connection 79, and is connected at its other end to the adjacent end of the stub shaft 73 by a universal joint connection 80 to drive the stub shaft 73 from the drum 10.

With this arrangement, when the machine is pulled forwardly over the ground, the drum will rotate and will, in turn, rotate the drive shaft 78 which, through the intermediacy of the chain 76 and associated chain sprocket, will rotate the cylinder 62 in a direction opposite the rotational direction of the drum 10 and at a speed materially higher than the rotational speed of the drum.

A scraper blade 82 is mounted on the front side of the lower bracket 52 secured on the outer end of the shaft 50 and this scraper blade is outwardly and forwardly inclined relative to the outer end of the boom 65 to assist in moving stones at the outer end of the boom to a location at which they can be effectively engaged by the toothed cylinder 62 of the boom and moved along this cylinder to the end of the boom to which the boom is connected.

A substantially horizontally disposed, U-shaped frame 83, has its legs 84 and 85 extending across the space between the plates 27 and 28 at the forward and rearward sides of the drum 10 and secured to these plates, and has an intermediate portion 86 extending across the lower portion of the end of the drum 10 remote from the boom 65. A guard plate 87 of partly circular shape is secured along its straight, upper edge to the intermediate portion 86 of the U-shaped frame member 83 and extends downwardly in covering relationship to the lower portion of the adjacent end of the drum 10, so that stones ejected from the drum 10 must pass over the upper edge of this guard plate.

Standards 90 and 91 are secured at their lower ends to the frame intermediate portion 86 at the forward and rearward sides of the drum 10 respectively, and extend perpendicularly upwardly from this frame intermediate portion. A shaft 92 extends between the standards 90 and 91 and is journaled in the standards near their upper ends and somewhat above the adjacent end of the drum 10 and a flap plate 93 is mounted along one edge on the shaft 92 between the standards 90 and 91 and is movable by rotation of the shaft 92 into and out of closing relationship to the portion of the adjacent end of the drum 10 above the upper edge of the guard plate 87. An operating shaft 94 is connected at one end to the forward end of the shaft 92 by universal joint connection 95 and this shaft extends forwardly to the front end of the tongue structure 26 and is journaled in a quadrant structure 96 mounted on the front end of the tongue. A hand lever 97 extends angularly from the front end of the operating shaft 94 and is engageable in one or the other of two spaced apart notches 98 and 99 provided in the forward edge of the quadrant structure. When the hand lever 97 is engaged in the notch 98 the flap plate 93 is disposed in closing relationship to the upper portion of the adjacent end of the drum 10 and, when the hand lever is engaged in the notch 99, the flap plate is moved to its position opening the upper portion of the adjacent end of the drum, as illustrated in Figures 1, 2 and 3. A discharge of stones from the drum 10 can thus be controlled by manual movement of the hand lever 97 from one to the other of the notches 98 and 99 in the quadrant structure 96.

Figure 7:
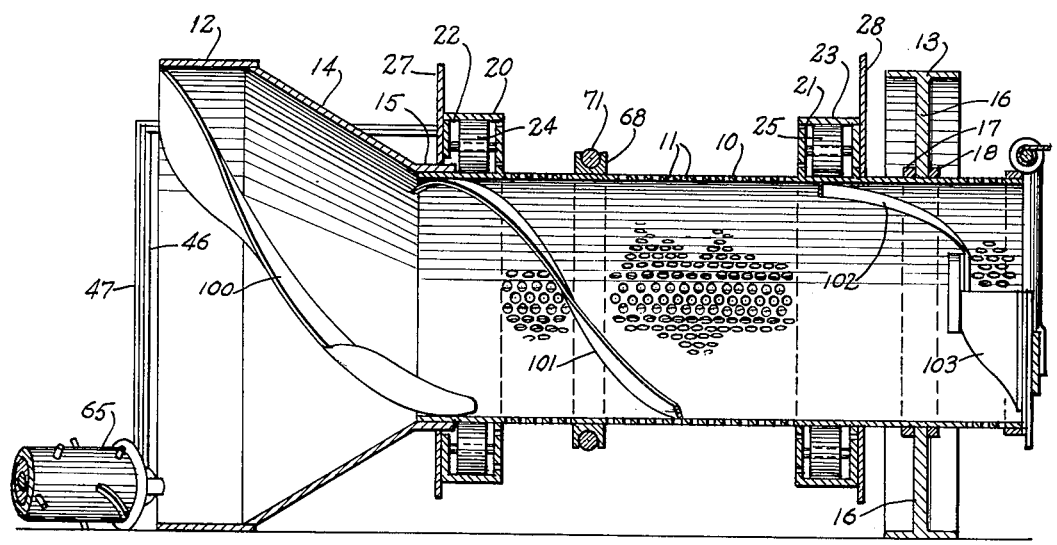
Figure 7 is a longitudinal cross sectional view on the line 7—7 of Figure 1.

Guiding means or spirally disposed vanes, as indicated at 100, are mounted in the tire 12 and adjacent the partly conical portion 14 of the drum and are effective to move stones brought by the rotatable boom 65 to the outer end of the tire 12 into the perforated, cylindrical portion of the drum 10. Spirally disposed vanes, as indicated at 101 and 102 in Figure 7, are mounted in the cylindrical portion of the drum and are effective to move stones from the end of the drum nearest the tire 12 to the opposite end of the drum. A scoop 103 mounted in the drum at the end of the drum adjacent the guard plate 87 and flap plate 93 is effective to raise the stones brought to this end of the drum and discharge them out of the adjacent end of the drum when the flap plate 93 is in its position opening the upper portion of the adjacent end of the drum.

A hopper, generally indicated at 105, is detachably mounted on the intermediate portion 86 of the frame member 83 at the adjacent end of the drum 10, and comprises a pair of side bars 106 and 107 having notches extending inwardly from their bottom edges near corresponding ends thereof and receiving the frame member intermediate portion 86 near the front and rear ends of this intermediate portion to detachably mount the hopper on the frame member 83, a floor plate 108 extending between the bottom edges of the side bars 106 and 107, and a movable end plate 109 disposed at the end of the hopper remote from the adjacent end of the drum. Supporting standards 110 and 111 extend vertically upwardly from the outer ends of the side bars 106 and 107 respectively, and side plates 112 and 113 are secured to the side bars and the associated standards to support the standards in upright position and close the corresponding ends of the hopper. A shaft 114 extends between and is journaled at its ends in the standards 110 and 111 near the upper ends of these standards, and the end plate 109 is secured along its upper edge to the shaft 114 and extends between the standards 110 and 111.

A lever 115 is pivotally mounted at its lower end on the front side bar 112 intermediate the length of this side bar and extends to a location somewhat above the upper end of the front standard 110. The shaft 114 is provided at its front end with a crank 116 and a link 117 pivotally connected at one end to the lever 115 intermediate the length of this lever is provided near its other end with an aperture rotatably receiving the distal end portion of the crank 116. A tension spring 118 connected between the lever 115 and the outer end of the hopper side bar 112 resiliently holds the hopper end plate 109 in closed position and a cable 120 connected to the upper end of the lever 115 extends through a cable sheave 121 mounted on the front side bar 112 near the inner end of this side bar and to the front end of the tongue structure 26 of the machine. A pull on the cable 120 will buckle the toggle linkage constituted by the lever 115 and link 117 and move the end plate 109 to its open position to discharge the contents from the hopper 105.

With the above described arrangement, the flap plate 93 can be opened at selected intervals to discharge the stones from the drum 10 into the hopper 105 after included clay and other material has been removed from the stones in the drum by the tumbling action of the stones incident to the rotation of the drum, and the hopper end plate can be opened at selected times to discharge the accumulated stones from the hopper.

Guides 122 and 123 are mounted on the legs 30 and 31 of the tongue structure intermediate the length of these legs and a hitch bar 124 extends slidably through these guides and to opposite sides of the tongue structure. This hitch bar is disposed substantially parallel to the rotational axis of the drum 10 and has at its end nearest the tire 12 an upwardly opening hook formation 125 adapted to receive and support the boom 65 when the boom is swung to an inoperative position in which it is substantially perpendicular to the longitudinal axis of the drum, the adjustable length brace 58 being disconnected at this time. A brace rod 126 extends from the front end of the tongue structure to the end of the hitch bar 124 remote from the hook formation 125 and, if desired, the hopper 105 can be detached from the machine and a wagon placed in the position of the hopper and connected to the hitch bar 124, so that it will be moved along with the machine and will receive the stones from the machine drum 10. Whenever the wagon has been filled, it can be unhitched from the machine and moved to a suitable location for dumping the stones.

The hitch bar is held against longitudinal movement relative to the guides 122 and 123 by detachable means, such as the pins 127 and 128 disposed at respectively opposite sides of the guide 122 and, when the pin 128 has been removed and the brace rod 126 disconnected, the hitch bar can be slid longitudinally through the guides for easy removal of the hitch bar from the frame when the hitch bar is not needed. Before placing the boom in its in operative position the drive shaft 78 will be separated, as well as the adjustable length brace 58, so that the boom cylinder will not be rotated while the boom is held in inoperative position for movement of the machine from one place to another.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A mobile stone gathering machine comprising a horizontally disposed open ended perforated drum, a first flat hollow open ended tire of a diameter larger than said drum arranged so that one of its open ends is in registry with and fixedly attached to one of the open ends of said drum and rollably engaging a ground surface, a second flat tire of the same diameter as said first tire circumposed about and fixedly attached to said drum inwardly of its other open end and rollably engaging said ground surface, a tongue structure having a rearward end and a forward end positioned forwardly of and extending transversely with respect to said drum and having the rearward end secured to said drum, a steerable wheel assembly supporting the forward end of said tongue structure, a hitch element carried by said wheel assembly for attaching a towing vehicle thereto, said tires and drum being rotatable in a clockwise direction responsive to towing movement of said tongue structure, a horizontally disposed rotatable stone gathering implement positioned on the side adjacent said first named tire and at an angle with respect thereto with one end contiguous to the other open end of said first tire and the other end forwardly of and spaced from said last mentioned tire, said one implement end being supported by said drum, said implement being engageable with said ground surface, means connecting said implement to said drum for rotation in counterclockwise direction responsive to the rotation of said tires and drum in the clockwise direction, guiding means in said first tire for directing stones from said gathering implement into the other end of said first tire, and a hopper disposed adjacent the other end of said drum for receiving the stones discharged from said drum.

2. A mobile stone gathering machine comprising a horizontally disposed open ended perforated drum, a first flat hollow open ended tire of a diameter larger than said drum arranged so that one of its open ends is in registry with and fixedly attached to one of the open ends of said drum and rollably engaging a ground surface, a second flat tire of the same diameter as said first tire circumposed about and fixedly attached to said drum inwardly of its other open end and rollably engaging said ground surface, a tongue structure having a rearward end and a forward end positioned forwardly of and extending transversely with respect to said drum and having the rearward end secured to said drum, a steerable wheel assembly supporting the forward end of said tongue structure, a hitch element carried by said wheel assembly for attachment of a towing vehicle thereto, said tires and drum being rotatable in a clockwise direction responsive to towing movement of said tongue structure, a horizontally disposed rotatable stone gathering implement positioned on the side adjacent said first named tire and at an angle with respect thereto with one end contiguous to the other open end of said first tire and the other end forwardly of and spaced from said last mentioned tire, said one implement end being connected to said drum for swinging movement horizontally and for up and down movement, a wheel supporting the other end of said implement, said implement being engageable with said ground surface, means connecting said implement to said drum for rotation in counterclockwise direction responsive to the rotation of said tires and drum in a clockwise direction, guiding means in said first tire for directing stones from said gathering implement into the other end of said first tire, and a hopper disposed adjacent the other end of said drum for receiving the stones discharged from said drum.

3. A mobile stone gathering machine comprising a horizontally disposed open ended perforated drum, a first flat hollow open ended tire of a diameter larger than said drum arranged so that one of its open ends is in registry with and fixedly attached to one of the open ends of said drum and rollably engaging a ground surface, a second flat tire of the same diameter as said first tire circumposed about and fixedly attached to said drum inwardly of its other open end and rollably engaging said ground surface, a tongue structure having a rearward end and a forward end positioned forwardly of and extending transversely with respect to said drum and having the rearward end secured to said drum, a steerable wheel assembly supporting the forward end of said tongue structure, a hitch element carried by said wheel assembly for attachment of a towing vehicle thereto, said tires and drum being rotatable in a clockwise direction responsive to towing movement of said tongue structure, a horizontally disposed rotatable stone gathering implement positioned on the side adjacent said first named tire and at an angle with respect thereto with one end contiguous to the other open end of said first tire and the other end forwardly of and spaced from said last mentioned tire, said one implement end being supported by said drum, said implement being engageable with said ground surface, means connecting said implement to said drum for rotation in counterclockwise direction responsive to the rotation of said tires and drum in the clockwise direction, a guard plate closing the lower portion of the other end of said drum, a flap plate closing the part of the other end of said drum above said guard plate and movable from the closing position to a position uncovering the said part, and a hopper disposed adjacent the other end of said drum for receiving the stones discharged over said guard plate.

4. A mobile stone gathering machine comprising a horizontally disposed open ended perforated drum, a first flat hollow open ended tire of a diameter larger than said drum arranged so that one of its open ends is in registry with and fixedly attached to one of the open ends of said drum and rollably engaging a ground surface, a second flat tire of the same diameter as said first tire circumposed about and fixedly attached to said drum inwardly of its other open end and rollably engaging said ground surface, a tongue structure having a rearward end and a forward end positioned forwardly of and extending transversely with respect to said drum and having the rearward end secured to said drum, a steerable wheel assembly supporting the forward end of said tongue structure, a hitch element carried by said wheel assembly for attachment of a towing vehicle thereto, said tires and drum being rotatable in a clockwise direction responsive to towing movement of said tongue structure, a horizontally disposed rotatable stone gathering implement positioned on the side adjacent said first named tire and at an angle with respect thereto with one end contiguous to the other open end of said first tire and the other end forwardly of an spaced from said last mentioned tire, said one implement end being connected to said drum for swinging movement horizontally and for up and down movement, a wheel supporting the other end of said implement, said implement being engageable with said ground surface, means connecting said implement to said drum for rotation in counterclockwise direction responsive to the rotation of said tires and drum in a clockwise direction, cooperating means carried by the forward end of said tongue structure and said implement adjacent its other end for releasably holding said implement in any selected position of its horizontal swinging movement, guiding means in said first tire for directing stones from said gathering implement into the other end of said first tire, and a hopper disposed adjacent the other end of said drum for receiving the stones discharged from said drum.

References Cited in the file of this patent
UNITED STATES PATENTS

| | | |
|---|---|---|
| 1,221,974 | Crowson | Apr. 10, 1917 |
| 1,380,936 | Steffan | June 7, 1921 |
| 1,406,063 | Nagy | Feb. 7, 1922 |